UNITED STATES PATENT OFFICE

KARL SCHIRMACHER, OF HOCHST-ON-THE-MAIN, HANS SCHLICHENMAIER AND WALTER KROSS, OF BAD-SODEN, AND WILHELM SCHAICH, HANS TAMPKE, AND HANS NEUMANN, OF HOCHST-ON-THE-MAIN, GERMANY, ASSIGNORS TO GENERAL ANILINE WORKS, INC., OF NEW YORK, N. Y., A CORPORATION OF DELAWARE

2-ACYLAMINOANTHRAHYDROQUINONE COMPOUNDS AND PROCESS FOR PREPARING THE SAME

No Drawing. Application filed October 27, 1927, Serial No. 229,263, and in Germany October 30, 1926.

The present invention relates to new compounds of the general formula:

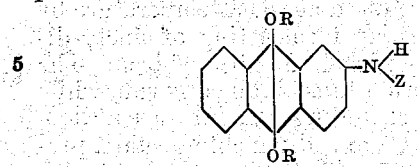

wherein R stands for alkyl, aralkyl, a $SO_3$-metal group or the residue of an acyclic carboxylic acid and Z stands for hydrogen, acyl, alkyl, aralkyl or aryl and to a process of preparing the same.

We have found that by the reduction of 2-acylaminoanthraquinones or analogues homologues or N-or nuclear-substitution products thereof there are exclusively obtained the corresponding hydroquinones if the said compounds are reduced in suspension or solution by means of hydrogen under pressure and in the presence of a suitable metallic catalyst at a low or moderately raised temperature, if desired with addition of an alkali. The formation of anthrones which was to be expected does not occur at all or only in a very insignificant measure. Nor does any hydration of the nucleus take place. That this is the effect of the reduction is evident from the fact that 9.10-diethers or 9.10-di-esters are easily produced by etherifying or esterifying the reduction products obtained. In this manner 9.10-diethers or 9.10-di-esters or salts of the diestersulfonic acids of 2-acylaminoanthrahydroquinones are obtained in an excellent yield and purity, such as could not have been anticipated. For it is known that even the simplest anthrahydroquinone is a very sensitive body which is not only capable of autoxidation, but is also very easily split into anthraquinone on the one hand and anthrone on the other hand (cf. K. H. Meyer, Liebigs Annalen der Chemie, vol. 379, page 44). This occurs particularly easily in strong acids, as for instance concentrated sulfuric acid or chlorosulfonic acid. It was presumed not only that the acylaminoanthrahydroquinones behave similarly but also that in view of the mobility of the acyl groups further complications would occur, as for instance elimination of the acyl group and subsequent alkylation or sulfonation of the amino group. When according to the present invention a catalytic reduction is applied which occurs under very mild conditions, the acyl residue is not eliminated. There are in the first place obtained the derivatives of 2-acylamino-9.10-anthrahydroquinones which are important intermediate products for the manufacture of dyestuffs and lose the acyl group only when further treated with hot alkali.

The following examples serve to illustrate our invention, but they are not intended to limit it thereto, the parts being parts by weight.

1. 26,5 parts of 2-acetaminoanthraquinone of the following formula:

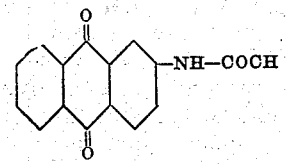

are suspended in 200 parts of alcohol, to this suspension are added 2 parts of a hydrogenating nickel catalyst obtainable according to British patent specification No. 255,884, and the whole is stirred in an autoclave under 20 atmospheres pressure of hydrogen. Hydrogen is absorbed already at ordinary temperature with evolution of heat and the absorption is finished after a short time. To the suspension of the easily oxidizable 2-acetamino-9.10-anthrahydroquinone thus prepared are added 25 parts of caustic soda solution of 40° Bé. and some water, and to this mixture are then added at ordinary temperature, while excluding air and well stirring, 30 parts of dimethylsulfate. Heat is evolved during this reaction and it is advantageous to take care that the temperature does not exceed 40° C. The mass is kept alkaline and, if required, some further dimethyl sulfate is added thereto until the red color of the alkaline solution has disappeared. When the reaction is finished the hitherto unknown 2-acetamino-9.10- anthrahydroquinonedimethylether of the following formula:

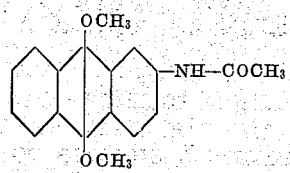

is completely separated by the addition of water; it is a greenish-yellow crystalline product melting in a crude state at 235°–240° C. and after a single crystallization from alcohol at 253° C. It dissolves in alcohol, benzene and glacial acetic acid to a solution having a green fluorescence.

2. By using instead of the alcohol in Example 1 the corresponding quantity of water, adding beforehand the 25 parts of caustic soda solution of 40° Bé., but otherwise proceeding at ordinary temperature as indicated in Example 1, a product is obtained which is identical with that obtainable according to Example 1. In this case a clear deep-red solution is obtained by the reduction.

3. 26,5 parts 2-acetaminoanthraquinone are treated, as indicated in Example 1, with hydrogen and a suitable nickel catalyst in the presence of 200 parts of dry pyridine or another tertiary base as for instance dimethylaniline or, even, for instance, chlorobenzene. Hydrogen is absorbed in a surprisingly rapid manner already at ordinary temperature. After the absorption of such a quantity of hydrogen as corresponds to two atomes of hydrogen is finished the resulting solution or suspension is slowly run, while excluding air, into mixture of 200 parts of pyridine and 60 parts of chlorosulfonic acid and the whole is kept for about 1 hour at about 60–65° C. while stirring. After cooling, the mass is poured into ice-water and the precipitating pyridine salt of the 2-acetaminoanthrahydrochinon-9.10-diester-sulfonic acid is filtered off. By treating this salt with sodium carbonate, the sodium salt, which is very readily soluble in water and has a violet blue fluorescence, is obtained. By boiling the latter with a caustic potash solution, the acetyl-group is eliminated and the di-potassium-salt of 2-aminoanthrahydroquinone-9.10-diester-sulfonic acid of the following formula:

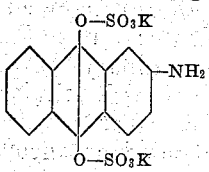

is obtained, which can be separated by the addition of potassium chloride.

The said potassium salt is readily soluble in water to a solution having a green fluorescence which disappears on acidifying. When the reduction occurs in a solvent like chlorobenzene, the corresponding anthrahydroquinone is precipitated. It can be dissolved by the addition of pyridine. When using 2-formylaminoanthraquinone of the following formula:

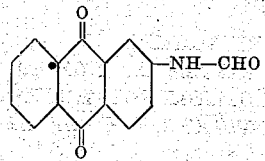

there is also obtained as final product the 2-amino-anthrahydroquinone diestersulfonate.

4. 265 parts of 2-acetaminoanthraquinone are finely ground in ball mill with 2000 parts of water, there are then added 228 parts of caustic soda solution of 35% strength and the whole is reduced at room temperature by means of a catalyst consisting of finely divided metallic nickel and 10% of iron. The dark-red solution thus obtained is run, while stirring and excluding air, into a solution, heated to 80° C., of sodium chloracetate, prepared from 240 parts of chloracetic acid with a little water and 140 parts of calcined sodium carbonate. The temperature is maintained for 5 hours at 80–90° C., the mass is then diluted with water, heated to boiling and the byproduct which has separated is filtered off in the heat. The filtrate is acidified by means of hydrochloric acid in the cold which causes the separation of the 2-acetylaminoanthrahydroquinone 9.10-diactic acid. This acid is isolated by filtration and washing and can be purified by precipitation from a diluted soda solution. The compound is readily soluble in sodium carbonate, caustic soda solution and pyridine. Its diluted alkaline solution shows an intense blue fluorescence, it is sparingly soluble in water and in the usual organic solvents. In concentrated sulfuric acid it dissolves to a green solution. In a dry state it forms a faint yellow powder which melts at about 240° C. When the compound is boiled for a prolonged time with a normal caustic soda solution, the acetyl group is split off and on cautious acidification the 2-aminoanthrahydroquinone-9.10-diacetic acid of the following formula:

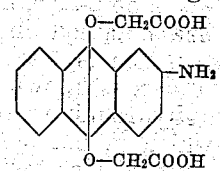

is obtained the diluted alkaline solution of which shows an intense green fluorescence.

We claim:

1. The process which comprises treating with hydrogen 2-acetylaminoanthraquinone in the presence of a solvent and a suitable metal catalyst at ordinary temperature and under pressure and replacing in the so produced 2-acetylamino-9.10-anthrahydroquinone, the hydrogen atoms of the 9.10-OH groups by SO₃Me groups, Me representing a metal or an organic base.

2. The process which comprises treating 2-acetylaminoanthraquinone in an autoclave with hydrogen in the presence of a tertiary base and a suitable nickel catalyst at a moderate temperature under about 20 atmospheres pressure causing the solution thus obtained containing the 2-acetylamino anthrahydroquinone to act slowly at about 30° C. to 60° C., while excluding air, upon a mixture of a tertiary base and the SO₃-addition product thereof and converting the compound so obtained into the corresponding sodium salt by means of sodium carbonate.

3. The process which comprises treating 2-acetylaminoanthraquinone in an autoclave with hydrogen in the presence of pyridine and a suitable nickel catalyst at a moderate temperature under about 20 atmospheres pressure, causing the solution thus obtained containing the 2-acetylaminoanthrahydroquinone to act slowly at about 30° C. to 60° C. while excluding air, upon a mixture of pyridine and an addition product of pyridine and SO₃ and converting the compound so obtained into the corresponding sodium salt by means of sodium carbonate.

4. As a new product, the sodium 2-acetyl-aminoanthrahydroquinone-9.10-diestersulfonate of the following formula:

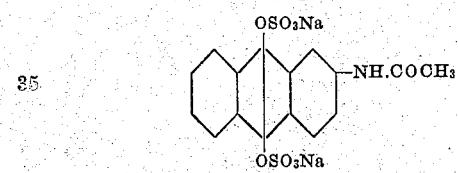

being a salt which is very readily soluble in water, yielding a solution having an intense violet-blue fluorescence, splitting off the acetyl group, when boiled with an alkali, its solution showing then a green fluorescence.

5. As new products the compounds of the general formula:

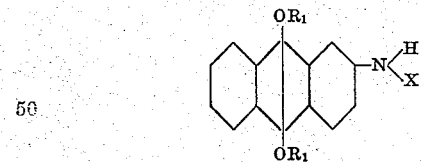

wherein X stands for hydrogen or the acetyl group and R₁ stands for CH₃, CH₂COOH or SO₃-metal, generally yielding solutions with a strong fluorescence.

6. As a new product, the di-potassium-2-aminoanthrahydroquinone-9.10-diester-sulfonate of the following formula:

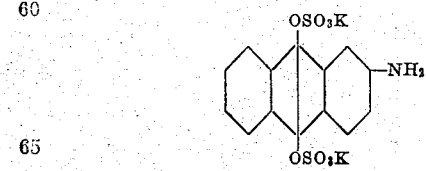

being a salt which is readily soluble in water to a solution having a green fluorescence which disappears on acidifying.

In testimony whereof, we affix our signatures.

KARL SCHIRMACHER.
HANS SCHLICHENMAIER.
WALTER KROSS.
WILHELM SCHAICH.
HANS TAMPKE.
HANS NEUMANN.

Certificate of Correction

Patent No. 1,829,840.                          Granted November 3, 1931, to

KARL SCHIRMACHER ET AL.

It is hereby certified that error appears in the printed specification of the above-numbered patent requiring correction as follows: Page 1, lines 70 to 77, Example 1, strike out the formula and insert instead—

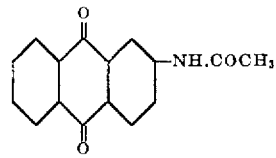

and that the said Letters Patent should be read with this correction therein that the same may conform to the record of the case in the Patent Office.

Signed and sealed this 9th day of February, A. D. 1932.

[SEAL.]                                                             M. J. MOORE,
*Acting Commissioner of Patents.*